US012688987B2

(12) United States Patent
Li et al.

(10) Patent No.: US 12,688,987 B2
(45) Date of Patent: Jul. 21, 2026

(54) BIDIRECTIONAL OPERATION MECHANISM FOR SWITCHING DEVICE AND SWITCHING DEVICE ASSEMBLY

(71) Applicant: Schneider Electric (China) Co., Ltd., Beijing (CN)

(72) Inventors: Xiaoqiang Li, Shanghai (CN); Zhen Li, Shanghai (CN); Meng Du, Shanghai (CN); Shunxian Mao, Shanghai (CN); Zhenzhong Liu, Shanghai (CN); Junqi Xiang, Shanghai (CN); Jiamin Chen, Shanghai (CN)

(73) Assignee: Schneider Electric (China) Co., Ltd., Beijing (CN)

( * ) Notice: Subject to any disclaimer, the term of this patent is extended or adjusted under 35 U.S.C. 154(b) by 358 days.

(21) Appl. No.: 18/515,431

(22) Filed: Nov. 21, 2023

(65) Prior Publication Data

US 2025/0046545 A1 Feb. 6, 2025

(30) Foreign Application Priority Data

Jul. 31, 2023 (CN) ........................ 202310953065.7

(51) Int. Cl.
*H01H 21/22* (2006.01)
*H01H 21/04* (2006.01)
*H01H 21/36* (2006.01)

(52) U.S. Cl.
CPC ............ *H01H 21/22* (2013.01); *H01H 21/04* (2013.01); *H01H 21/36* (2013.01)

(58) Field of Classification Search
CPC ........ H01H 21/22; H01H 21/04; H01H 21/36; H01H 3/00; H01H 3/02; H01H 3/12; H01H 3/32; H01H 3/42; H01H 71/10; H01H 71/56; H01H 2071/565; H01H 2019/00; H01H 2019/02; H01H 2019/10; H01H 2019/14; H01H 2071/10; H01H 2071/1009; H01H 2221/00; H01H 2221/008; H01H 2221/01; H01H 2221/024; H01H 13/50; H01H 19/00; H01H 19/02; H01H 19/10; H01H 19/14; H01H 19/20; H01H 19/36;
(Continued)

(56) References Cited

U.S. PATENT DOCUMENTS

| | | | | |
|---|---|---|---|---|
| 7,733,199 | B2 * | 6/2010 | Dauer .................... | H01H 71/56<br>335/6 |
| 2023/0154702 | A1 | 5/2023 | Zhang et al. | |

FOREIGN PATENT DOCUMENTS

| | | | |
|---|---|---|---|
| DE | 4312428 | C1 | 11/1994 |
| GB | 2279810 | A | 1/1995 |

* cited by examiner

*Primary Examiner* — Anthony R Jimenez
(74) *Attorney, Agent, or Firm* — Quinn IP Law

(57) ABSTRACT

A bidirectional operation mechanism for a switching device and a switching device assembly. The bidirectional operation mechanism includes: a housing; an operation handle; a first driving member, rotatably installed to the housing, fixedly connected to the operation handle; a second driving member, rotatably installed to the housing, operatively connected to the first driving member and the switching device, upon an external force acting on the operation handle to drive the operation handle rotate between the closed position and the open position, the operation handle drives the first driving member to rotate together, so that the first driving member abuts against and drives the second driving member to rotate, enabling the switching device to perform a closing operation and an opening operation.

20 Claims, 8 Drawing Sheets

(58) Field of Classification Search
CPC ........... H01H 2003/00; H01H 2003/02; H01H 2003/08; H01H 2003/32
See application file for complete search history.

BIDIRECTIONAL OPERATION MECHANISM FOR SWITCHING DEVICE AND SWITCHING DEVICE ASSEMBLY

TECHNICAL FIELD

The present disclosure relates to a bidirectional operation mechanism for a switching device and a switching device assembly.

BACKGROUND

At present, the operation mechanisms that drive disconnectors or circuit breakers in the market are mostly controlled manually. The external handle drives the closing operation and the opening operation of the internal contact system, and the handle also has the function of state indication. A small number of automatic operation mechanisms can be realized by adding the function of driving module, but this driving mode generally directly drive the handle, and the indication function of opening and closing needs an additional device to realize.

SUMMARY

In order to overcome the above problems, the present disclosure provides a bidirectional operation mechanism for a switching device, the bidirectional operation mechanism is installed to the switching device and includes: a housing; an operation handle, rotatably installed to the housing, capable of rotating between a closed position and an open position, and indicating the closed position and the open position; a first driving member, rotatably installed to the housing, fixedly connected to the operation handle and capable of rotating together with the operation handle; a second driving member, rotatably installed to the housing, operatively connected to the first driving member on one hand, and operatively connected to the switching device on the other hand, upon an external force acting on the operation handle to drive the operation handle rotate between the closed position and the open position, the operation handle drives the first driving member to rotate together, so that the first driving member abuts against and drives the second driving member to rotate, thereby enabling the switching device to perform a closing operation and an opening operation, upon the switching device performing the closing operation and the opening operation under an action of a driving force of the switching device itself, the switching device is able to drive the second driving member to rotate, so that the second driving member abuts against and drives the first driving member to rotate, thereby driving the operation handle to rotate, so as to indicate the closed position or the open position.

Advantageously, further including: a transmission member, pivotally arranged on the second driving member and capable of pivoting between an abutting position and a disengaged position; and a trigger member, pivotally arranged on the second driving member and capable of pivoting between a locked position and an unlocked position under an action of an electromagnet associated with the trigger member, in the locked position of the trigger member, the trigger member is located on a pivoting path of the transmission member along the first direction, is able to abut against the transmission member in the abutting position and prevent the transmission member from pivoting in the first direction, upon the transmission member being in the disengaged position, the trigger member does not abut against the transmission member, the first direction corresponds to a rotating direction of the operation handle from the closed position to the open position, in the unlocked position of the trigger member, the trigger member is not located on the pivoting path of the transmission member along the first direction and does not abut against the transmission member.

Advantageously, in the closed position, the trigger member abuts against the transmission member, and upon an external force acting on the operation handle to drive the operation handle to rotate from the closed position to the open position, the transmission member pivots from the abutting position to the disengaged position, and a driving force of the first driving member is not transmitted to the second driving member;

- in the open position, the trigger member does not abut against the transmission member, and upon an external force acting on the operation handle to drive the operation handle to rotate from the open position to the closed position, the transmission member pivots from the disengaged position to the abutting position, so that a driving force of the first driving member is able to be transmitted to the second driving member;
- in the closed position, upon the switching device performing the closing opening operation under the action of the driving force of the switching device itself, the transmission member stays in the abutting position and abuts against the trigger member, so that a driving force of the second driving member is able to be transmitted to the first driving member;
- in the open position, upon the switching device performing the closing operation under the action of the driving force of the switching device itself, the transmission member stays in the disengaged position without abutting against the trigger member, and a driving force of the second driving member is not transmitted to the first driving member.

Advantageously, the first driving member includes a protrusion extending toward the second driving member, and the second driving member includes a groove, the protrusion of the first driving member extends into the groove, and the protrusion is configured to abut against the transmission member.

Advantageously, in the closed position, upon an external force acting on the operation handle to drive the operation handle to rotate from the closed position to the open position, the first driving member rotates in the first direction, causing the transmission member to pivot from the abutting position to the disengaged position without abutting against the trigger member, after the first driving member rotating by a predetermined angle, the protrusion of the first driving member abuts against one end of the groove and pushes the second driving member to rotate in the first direction, so that the switching device performs the opening operation.

Advantageously, the trigger member includes a first mating feature and the transmission member includes a second mating feature, in the locked position of the trigger member, upon the transmission member pivoting in the first direction, the second mating feature of the transmission member will abut against the first mating feature of the trigger member, thus being blocked by the trigger member.

Advantageously, the first mating feature and the second mating feature are in the form of hooks.

Advantageously, upon an external force acting on the operation handle in the open position to drive the operation handle to rotate from the open position to the closed position, the first driving member rotates in a second direction, causing the protrusion of the first driving member to push the transmission member from the disengaged position to the abutting position, and after the first driving member rotating for a predetermined angle, the transmission member pivots to the abutting position to abut against the trigger member, and then the first driving member continues to rotate in the second direction to drive the second driving member to together rotate in the second direction through the transmission member and the trigger member, so that the switching device performs the closing operation.

Advantageously, in the closed position, upon the switching device performing the opening operation under the action of the driving force of the switching device itself, the second driving member rotates in the first direction, at this time, the trigger member is in the locked position and the transmission member is in the abutting position, so that the trigger member and the transmission member abut against each other, so that a driving force of the second driving member is transmitted to the first driving member, so that the first driving member also rotates in the first direction, thereby driving the operation handle to rotate from the closing position to the open position.

Advantageously, further including an operation handle spring, one end of the operation handle spring is operatively connected to the operation handle, and the other end of the operation handle spring is fixed to the housing, and is configured such that, in a case that the operation handle is driven by the second driving member to rotate from the closed position to the open position, upon the second driving member rotating in place, the operation handle spring passes through a dead point position, the first driving member continues to rotate in the first direction, so that the protrusion pushes the transmission member to pivot in the second direction from the abutting position to the disengaged position, and disengage from abutment with the trigger member.

Advantageously, in the opening position, upon the switching device performing the closing operation under the action of the driving force of the switching device itself, the second driving member rotates in the second direction, at this time, the trigger member is in the locked position and the transmission member is in the disengaged position, one end of the groove of the second driving member abuts against the protrusion of the first driving member, and a rotation of the second driving member pushes the first driving member to rotate in the second direction, so that the operation handle rotates from the open position to the closed position.

Advantageously, upon the operation handle being driven by the second driving member to rotate from the open position to the closed position, upon the second driving member rotating in place, the operation handle spring passes through the dead point position, the first driving member continues to rotate in the second direction, so that the protrusion pushes the transmission member to pivot in the first direction from the disengaged position to the abutting position, and abuts against the trigger member in the locked position.

Advantageously, the transmission member includes a pivoting part and a first leg and a second leg extending from the pivoting part, and the protrusion of the first driving member extends between the first leg and the second leg and abuts against the first leg and the second leg.

in the closed position, upon an external force acting on the operation handle to drive the operation handle to rotate from the closed position to the open position, the protrusion pushes the first leg of the transmission member to drive the transmission member to pivot to the disengaged position in a second direction opposite to the first direction, in the open position, upon an external force acting on the operation handle to drive the operation handle to rotate from the open position to the closed position, the protrusion pushes the second leg of the transmission member to drive the transmission member to pivot to the abutting position in the first direction, in the closed position, upon the switching device performing the opening operation under the action of the driving force of the switching device itself, the second leg of the transmission member pushes the protrusion of the first driving member to drive the first driving member to rotate in the first direction, upon the second driving member rotating in place, the operation handle spring passes through the dead point position, the first driving member continues to rotate in the first direction, so that the protrusion pushes the first leg to pivot in the second direction from the abutting position to the disengaged position, disengage from abutment with the trigger member, in the open position, upon the switching device performing the closing operation under the action of the driving force of the switching device itself, one end of the groove of the second driving member pushes the protrusion to drive the first driving member to rotate, and upon the second driving member rotating in place, the operation handle spring passes through the dead point position, the first driving member continues to rotate, so that the protrusion pushes the second leg to pivot from the disengaged position to the abutting position in the first direction, and abuts against the trigger member in the locked position.

Advantageously, the transmission member includes a pivoting part and a single leg extending from the pivoting part, and one end of a torsion spring is fixedly connected to the pivoting part of the transmission member and the other end of the torsion spring is fixedly connected to the second driving member, and the torsion spring is configured to keep the protrusion of the transmission member and the first driving member in contact all the time, in the closed position, the protrusion abuts against a part of the single leg to keep the transmission member in the abutting position, and upon an external force acting on the operation handle to drive the operation handle to rotate from the closed position to the open position, the protrusion disengages from abutment with the single leg, so that the transmission member pivots to the disengaged position under an action of the torsion spring, in the open position, upon an external force acting on the operation handle to drive the operation handle to rotate from the open position to the closed position, the protrusion rotates to abut against the single leg and pushes the transmission member to pivot to the abutting position in the first direction, in the closed position, upon the switching device performing the opening operation under the action of the driving force of the switching device itself, the single leg of the transmission member pushes the protrusion of the first driving member to drive the first driving member to rotate in the first direction, upon the second driving member rotating in place, the operation handle spring passes through the dead point position, so that the first driving member continues to rotate in the first direction, so that the single leg pivots in the second direction from the abutting position to the disengaged position under an action of the torsion spring, in the open position, upon the switching device performing the closing operation under the action of the driving force of the switching device itself, one end of the groove of the second driving member pushes the protrusion to drive the first driving member to rotate, upon the second driving member rotating in place, the operation handle spring passes through the dead point position, the first driving member continues to rotate, so that an elastic force of the torsion spring pushes the single leg to pivot in the first direction from the disengaged position to the abutting position, and abuts against the trigger member in the locked position.

Advantageously, upon the switching device performing a tripping operation, the electromagnet associated with the trigger member is configured to receive an electrical signal of the switching device for tripping operation, so as to drive the trigger member to pivot from the locked position to the unlocked position, and then the second driving member rotates in the first direction, upon the operation handle being blocked and being not able to rotate, the transmission member is pushed by the protrusion of the first driving member to rotate in the first direction, and the protrusion of the first driving member relatively moves in the groove of the second driving element.

Advantageously, further including a return spring arranged between the first driving member and the second driving member, upon the switching device performing the tripping operation, the return spring stores energy along with a rotation of the second driving member in the first direction, after the second driving member rotates in place, in a case that the operation handle is released, the first driving member and the operation handle rotate together in the first direction under an action of the return spring.

Advantageously, further including a first sensor, arranged at a side of the first driving member and is configured that, in the closed position of the operation handle, the first driving element excites the first sensor, and the first sensor is communicatively connected to an electronic switch of the switching device, and upon the operation handle driving the first driving member to leave the closed position, the first driving member deactivates the first sensor, so that the first sensor sends an opening warning signal to the electronic switch.

Advantageously, further including a second sensor, arranged at another side of the first driving member opposite to the side, and is configured that, in the open position of the operation handle, the first driving member excites the second sensor, and the second sensor is communicatively connected to the electronic switch of the switching device, and upon the operation handle driving the first driving member to rotate from the open position to the closed position, the first driving member deactivates the second sensor, so that the second sensor sends a closing warning signal to the electronic switch.

Advantageously, the first sensor and the second sensor are selected from microswitches, hall sensors and grating sensors.

The present disclosure also provides a switching device assembly, the switching device assembly includes a switching device and the bidirectional operation mechanism as described above, the bidirectional operation mechanism is installed to the switching device.

BRIEF DESCRIPTION OF DRAWINGS

The above and other features and advantages of exemplary embodiments of the present disclosure will become more apparent from the following detailed description with reference to the accompanying drawings, the description and accompanying drawings are for illustrative purposes only and are not intended to limit the scope of the present disclosure in any way, among the drawings.

DETAILED DESCRIPTION

Figure 1:
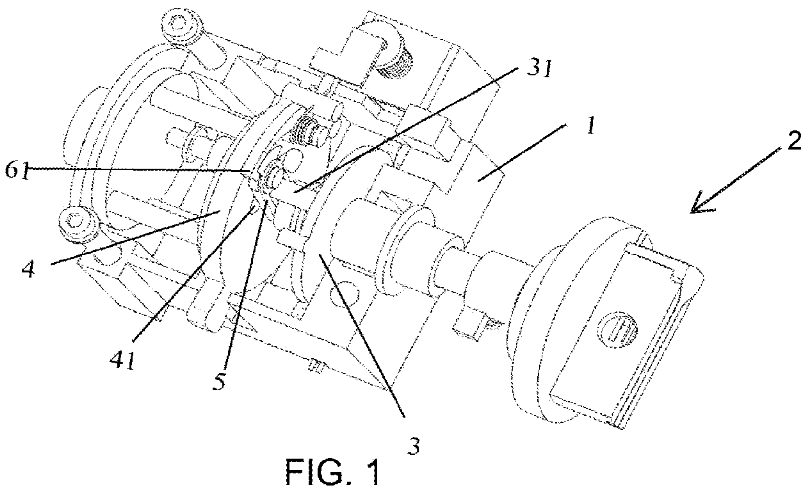
FIG. 1 shows a perspective view of a bidirectional operation mechanism according to the present disclosure, which is in a closed position.

In order to make the purpose, technical solution and advantages of the technical solution of the present disclosure more clear, the technical solution of the embodiment of the present disclosure will be described clearly and completely with reference to the accompanying drawings of specific embodiments of the present disclosure. The same reference numerals in the drawings represent the same parts. It should be noted that the described embodiment is a part of the embodiment of the present disclosure, not the whole embodiment. Based on the described embodiments of the present disclosure, all other embodiments obtained by those skilled in the field without creative labor belong to the protection scope of the present disclosure.

Compared with the embodiments shown in the accompanying drawings, the feasible embodiments within the protection scope of this disclosure may have fewer components, other components not shown in the accompanying drawings, different components, components arranged differently or components connected differently, etc. Furthermore, two or more components in the drawings may be implemented in a single component, or a single component shown in the drawings may be implemented as a plurality of separate components.

Unless otherwise defined, technical terms or scientific terms used herein shall have their ordinary meanings as understood by people with ordinary skills in the field to which this disclosure belongs. The words "first", "second" and similar words used in the specification and claims of the patent application of this disclosure do not indicate any order, quantity or importance, but are only used to distinguish different components. Upon the number of parts is not specified, the number of parts can be one or more; Similarly, similar words such as "one", "the" and "the" do not necessarily mean quantity limitation. Similar words such as "including" or "containing" mean that the elements or objects appearing before the word cover the elements or objects listed after the word and their equivalents, without excluding other elements or objects. Similar words such as "installation", "setting", "connection" or "connection" are not limited to physical or mechanical installation, setting and connection, but can include electrical installation, setting and connection, whether directly or indirectly. "Up", "Down", "Left" and "Right" are only used to indicate the relative orientation relationship upon the equipment is used or the orientation relationship shown in the accompanying drawings. Upon the absolute position of the described object changes, the relative orientation relationship may also change accordingly.

Hereinafter, the bidirectional operation mechanism according to the present disclosure will be described below with reference to FIGS. 1 to 14. The bidirectional operation mechanism of the present disclosure can be installed on a switching device, which includes but not limited to a circuit breaker, a contactor, a solid-state circuit breaker and a disconnector. The bidirectional operation mechanism is configured to be able to operate in both a forward direction and a reverse direction. Upon the bidirectional operation mechanism being operated in the forward direction, that is, upon closing and opening manually, the operation handle is manually operated to cause the switching device to open and close. Upon the bidirectional operation mechanism being operated in the reverse direction, that is, upon the switching device itself being electrically operated to open and close, the opening operation and the closing operation of the switching device can cause the operation handle to rotate, thus indicating the opening and closing.

As illustrated by FIG. 1, the bidirectional operation mechanism includes a housing 1, an operation handle 2, a first driving member 3 and a fourth driving member 4, which are all rotatably installed to the housing 1. In addition, the bidirectional operation mechanism also includes a transmission member 5 and a trigger member 6. The operation handle 2 is fixedly connected to the first driving member 3, so that both of them can rotate at the same time. In a forward operation, the operation handle 2 drives the first driving member 3 to rotate, and the first driving member 3 is able to drive the second driving member 4 to rotate through the transmission member 5 and the trigger member 6. In a reverse operation, the opening operation or the closing operation of the switching device drives the second driving member 4 to rotate, and the second driving member 4 is able to drive the first driving member 3 to rotate through the transmission member 5 and the trigger member 6.

Figure 14:
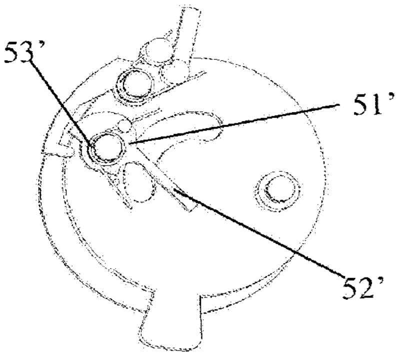
FIG. 14 shows a transmission member according to another embodiment.
Figure 15:
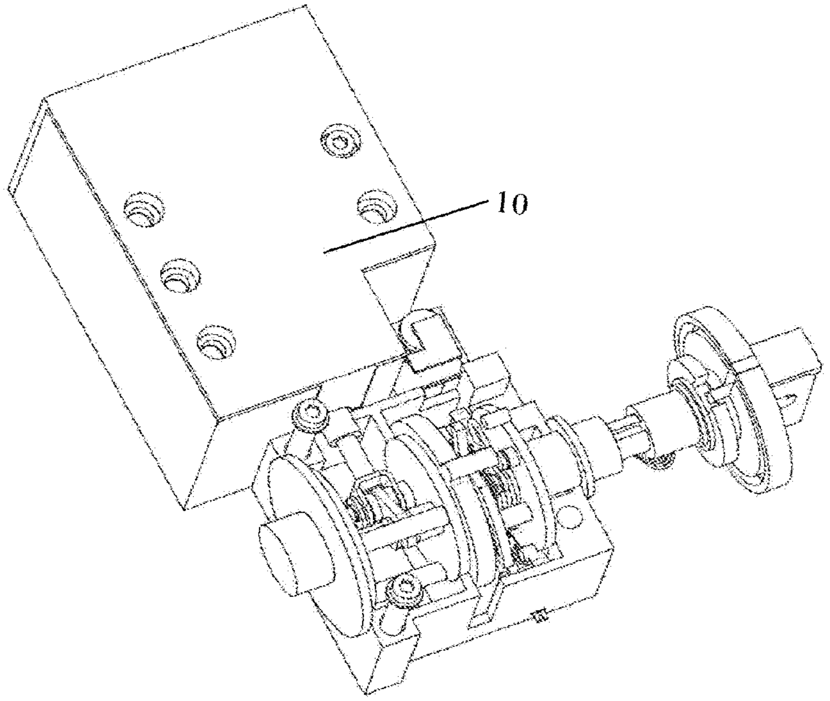
FIG. 15 shows a perspective view of a switching device assembly according to the present disclosure.

In the examples of FIGS. 1 to 13, a transmission member 5 of an embodiment is shown, and FIG. 14 shows a transmission member 5' of another embodiment. Although the structures of the two transmission members are different, the functions that the two transmission members of the two embodiments can achieve are exactly the same.

The transmission member is capable of pivoting between an abutting position and a disengaged position, and the trigger member is capable of rotating between a locked position and an unlocked position. In the abutting position, the transmission member abuts against the trigger member in the locked position; in the disengaged position, the transmission member disengages from the trigger member in the locked position, and in the unlocked position of the trigger member, the transmission member does not abut against the trigger member. During a normal operation, the trigger member is in the locked position, and only upon the switching device being tripped, the trigger member pivots to the unlocked position. In the locked position of the trigger member, the trigger member is located on a pivot path of the transmission member along the first direction (a rotating direction from the closed position to the open position), and is able to abut against the transmission member in the abutting position and prevent the transmission member from pivoting in the first direction, and the trigger member is not located on the pivot path of the transmission member along the first direction and does not abut against the transmission member.

Upon an external force acting on the operation handle to drive the operation handle to rotate from the open position to the closed position, and upon the switching device performing an opening operation under an action of a driving force of the switching device itself (e.g., electric drive, realized by electromagnetic coil, etc.), in the case that the transmission member abuts against the trigger member, both the transmission member and the trigger member can transmit a driving force between the first driving member and the second driving member.

In the example of FIGS. 1 to 13, the transmission member 5 is shown to include a pivoting part 51, a first leg 52 and a second leg 53 which extend from the pivoting part. The first driving member 3 includes a protrusion 31 extending toward the second driving member 4, the protrusion 31 extends between and abuts against the first leg 52 and the second leg 53, and the second driving member 4 includes a groove 41, and the protrusion 31 also extends into the groove 41.

The trigger member 6 has a first mating feature 61, and the transmission member 5 has a second mating feature 54, the second mating feature 54 of the transmission member is able to abut against the first mating feature 61 of the trigger member. In the illustrated example, the first mating feature and the second mating feature are in the form of hooks, but it should be understood by those skilled in the art that there are other mating features as long as the trigger member and the transmission member can be abutted.

Hereinafter, the structure of the present disclosure will be described in connection with the operation process.

Figure 2:
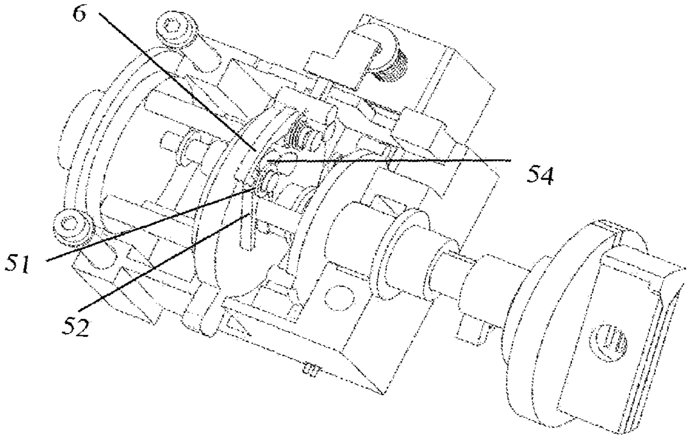
FIG. 2 shows a state diagram after an operation handle drives the first driving member to rotate by a predetermined angle during a manual movement from a closed position to an open position.
Figure 3:
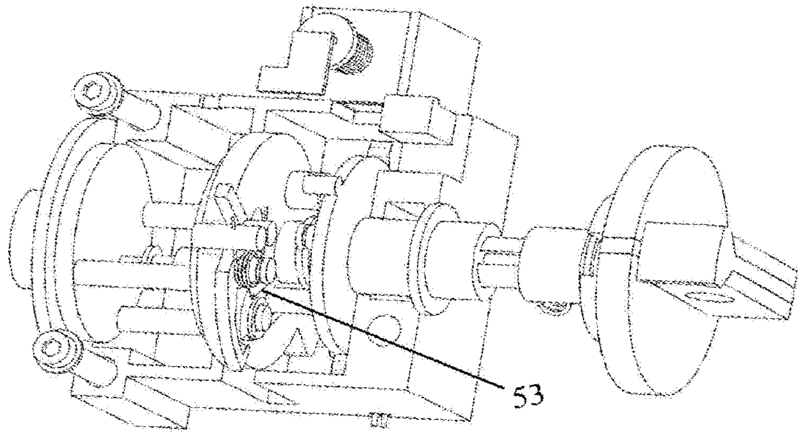
FIG. 3 shows a perspective view of a bidirectional operation mechanism according to the present disclosure, which is in an open position.
Figure 4:
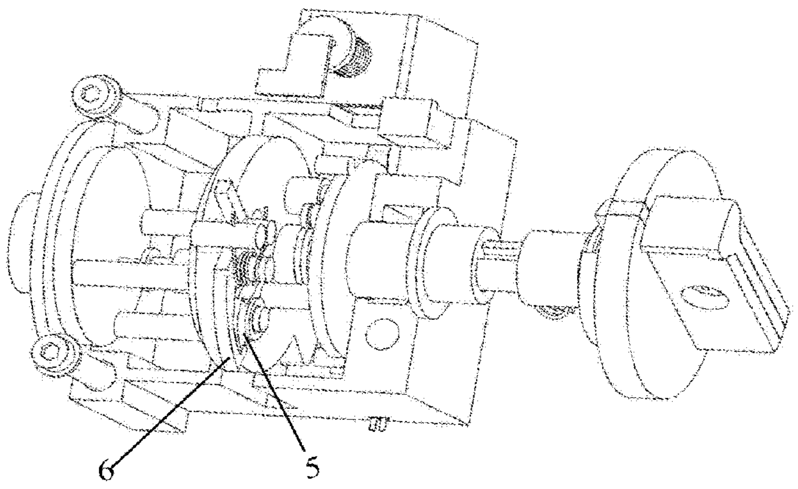
FIG. 4 shows a state diagram after the operation handle drives the first driving member to rotate by a predetermined angle during a manual movement from an open position to a closed position.
Figure 5:
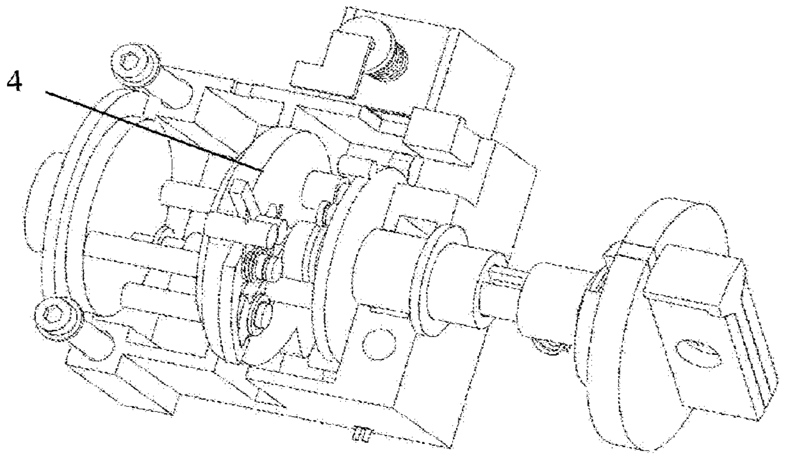
FIG. 5 shows a state diagram before a second driving member rotating in place and a first driving member does not continue to rotate under an action of the operation handle spring during an automatic movement from a closed position to an open position.
Figure 6:
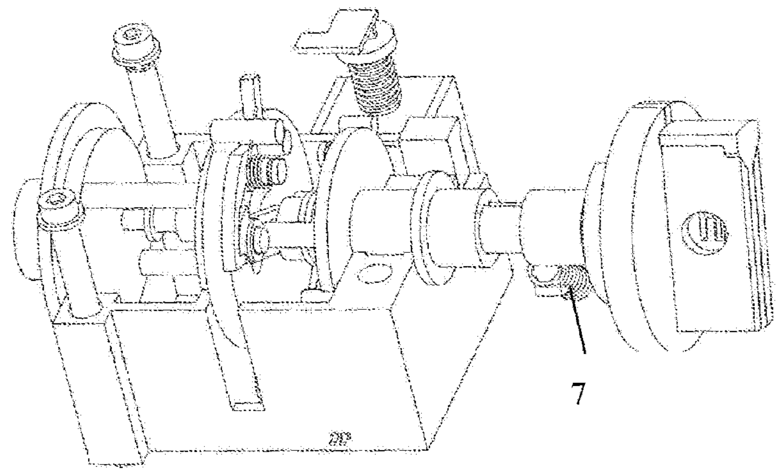
FIG. 6 shows another perspective view of FIG. 5.
Figure 7:
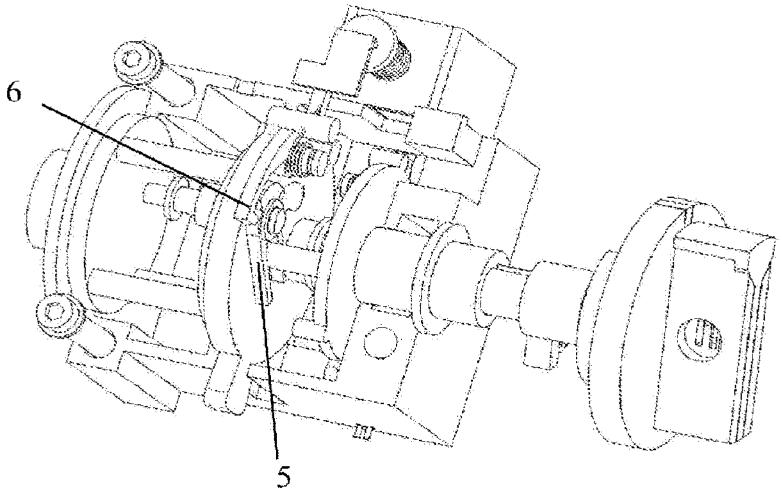
FIG. 7 shows a state diagram before a second driving member rotating in place and a first driving member does not continue to rotate under an action of the operation handle spring during an automatic movement from an open position to a closed position.
Figure 8:
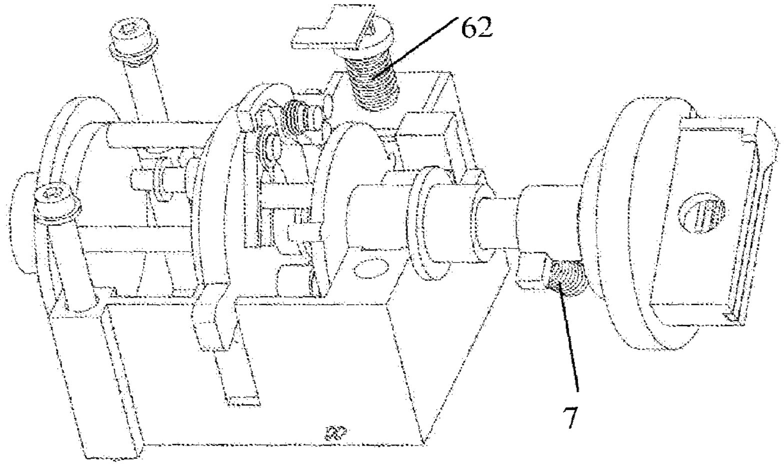
FIG. 8 shows another perspective view of FIG. 7.

FIG. 1 shows that the operation handle is in the closed position. In this case, the transmission member 5 is in the abutting position, the trigger member 6 is in the locked position, and the transmission member 5 abuts against the trigger member 6. Upon an external force acting on the operation handle to drive the operation handle to rotate in the first direction (i.e. a counterclockwise direction) from the closed position to the open position, the first driving member 3 also rotates in the first direction, so that the transmission member pivots from the abutting position to the disengaged position without abutting against the trigger member. In this example, the first driving member 3 rotates in the first direction, so that the protrusion 31 pushes the first leg 52, and the transmission member 5 pivots to the disengaged position in a second direction (i.e., a clockwise direction) opposite to the first direction, so as to disengage from the abutment with the trigger member 6. After the first driving member 3 rotating by a predetermined angle, the protrusion 31 of the first driving member abuts against one end of the groove, as illustrated by FIG. 2, and pushes the second driving member 4 to rotate in the first direction, and finally reaches the position shown in FIG. 3, so that the switching device performs the opening operation.

In the open position, upon an external force acting on the operation handle to drive the operation handle to rotate from the open position to the closed position, the first driving member 3 rotates in the second direction, so that the protrusion of the first driving member pushes the transmission member from the disengaged position to the abutting position. In this example, the first driving member 3 rotates in the second direction, so that the protrusion 31 pushes the second leg 53, and the transmission member pivots in the first direction, and reaches the position shown in FIG. 4, After the first driving member rotating by a predetermined angle, it reaches the position shown in FIG. 4. In this case, the transmission member 5 abuts against the trigger member 6 and is blocked by the trigger member. Then, the continued rotation of the first driving member 3 in the second direction drives the second driving member to rotate together in the second direction through the transmission member and the trigger member, so that the switching device performs the closing operation.

In the closed position, upon the switching device performing the opening operation under the action of the driving force of the switching device itself, the second driving member 4 rotates in the first direction. In this case, the trigger member is in the locked position and the transmission member is in the abutting position, so that the trigger member and the transmission member abut against each other, a driving force of the second driving member 4 is transmitted to the first driving member 3, so that the first driving member 3 also rotates in the first direction, thereby driving the operation handle to rotate from the closed position to the open position, and reach the position shown in FIGS. 5 and 6. In this case, the second driving member 4 has been rotated in place, but the first driving member 3 and the operation handle 2 have not been rotated in place. One end of an operation handle spring 7 is fixedly connected to the operation handle 1, and the other end of the operation handle spring 7 is fixed to the housing 2. The operation handle spring 7 is configured that upon the second driving member 4 rotating in place, the operation handle spring passes through the dead point position, the first driving member continues to rotate in the first direction, so that the protrusion pushes the second leg 53 of the transmission member 5 to pivot in the second direction from the abutting position to the disengaged position, disengage from the abutment with the trigger member, and finally reach the open position shown in FIG. 3.

In the open position, upon the switching device performing the closing operation under the action of the driving force of the switching device itself, the second driving member 4 rotates in the second direction. In this case, the trigger member is in the locked position and the transmission member is in the disengaged position, one end of the groove 41 of the second driving member abuts against the protrusion 31 of the first driving member, and the rotation of the second driving member pushes the first driving member to rotate in the second direction, so that the operation handle rotates from the open position to the closed position, and reaches the position shown in FIGS. 7 and 8. At this position, the second driving member has been rotated in place, however, the first driving member and the operation handle have not been rotated in place. At this time, the operation handle spring passes through the dead point position, the first driving member 3 continues to rotate in the second direction, so that the protrusion pushes the transmission member to pivot from the disengaged position to the abutting position in the first direction, and abut against the trigger member in the locked position.

In the above description, upon the switching device performing the opening operation and closing operation under the action of the driving force of the switching device itself, after the second driving member rotating in place, it is needed that operation handle spring drives the first driving member to continue to rotate to finally rotate in place, during this period, a "lost motion" is created, and the "lost motion" is used in the manual opening and closing operations.

Figure 9:
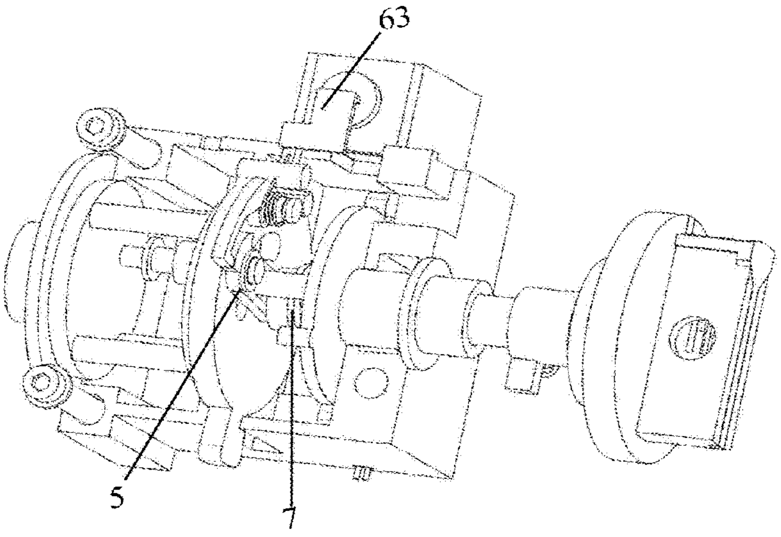
FIG. 9 shows a perspective view of an electromagnet driving the trigger member to pivot to the unlocked position during a free tripping period.

FIG. 9 shows that, during s tripping period, the switching device is tripped under the action of a tripper of the switching device itself. In this case, the electromagnet 62 associated with the trigger member 6 is configured to receive an electrical signal of tripping operation of the switching device, press the trigger member 6 through a pressing member 63, so that the trigger member 6 pivots from the locked position to the unlocked position. At this time, the operation handle cannot rotate due to accidents, then, the tripping operation of the switching device drives the second driving member 4 to rotate in the first direction, causing the protrusion to push the second leg 53 of the transmission member 5, so that the transmission member rotates in the first direction, and the protrusion of the first driving member relatively moves in the groove of the second driving member, thus reaching the position as illustrated by FIG. 10.

After the electromagnet 62 is de-energized, the trigger member 6 can return to the locked position under the action of a return spring 63. One end of the return spring 63 is fixedly connected to the second driving member, and the other end of the return spring 63 is fixedly connected to the trigger member.

Figure 10:
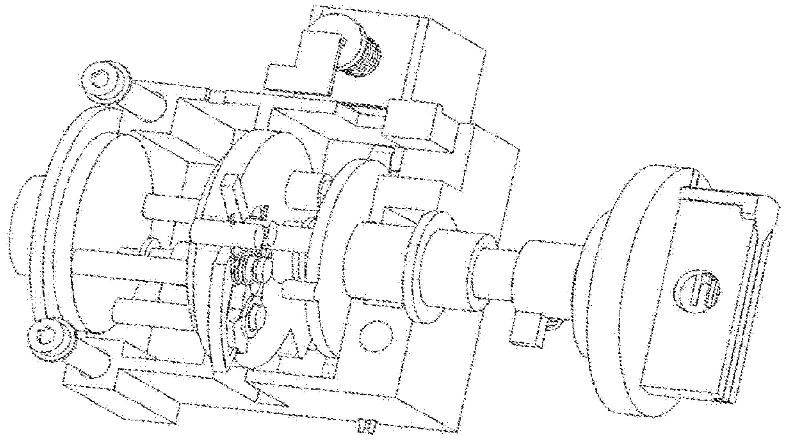
FIG. 10 is a perspective view showing that a second driving member rotates from a closed position to an open position, and an operation handle cannot rotate because the operation handle is blocked during a free tripping period.
Figure 11:
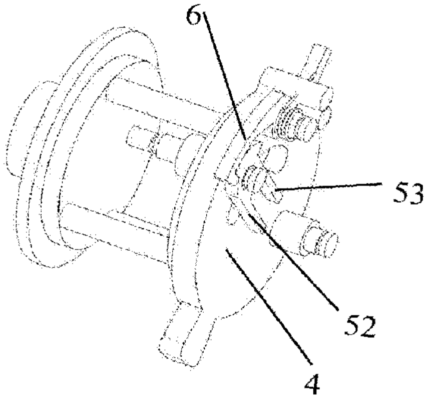
FIG. 11 shows a perspective view showing that a second driving member, a trigger member and a transmission member are installed together.

A return spring 7 is also arranged between the first driving member 3 and the second driving member 4, upon the switching device performing a tripping operation, if the blocking of the operation handle disappears after reaching the position as shown in FIG. 10, the first driving member and the operation handle can rotate together in the first direction under the action of the return spring 7.

Figure 12:
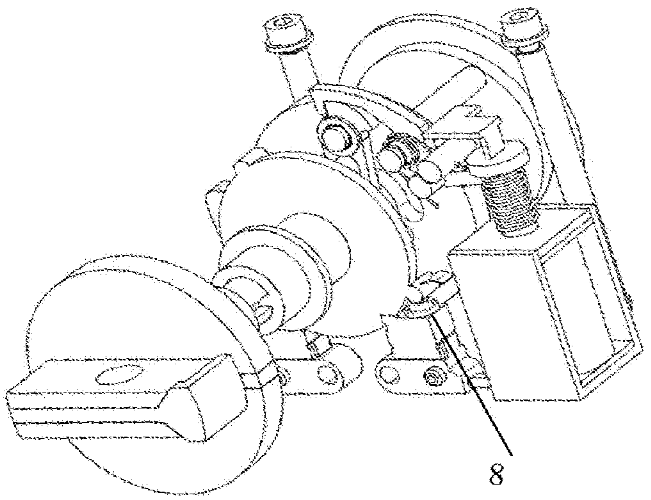
FIG. 12 shows a perspective view showing that a first driving member abuts against a first sensor in a closed position.
Figure 13:
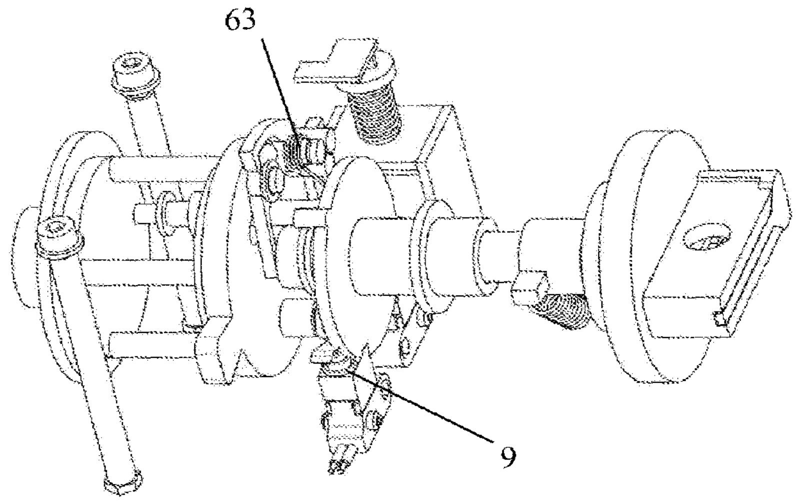
FIG. 13 shows a perspective view showing that a second driving member abuts against a second sensor in an open position.

The bidirectional operation mechanism may also include a first sensor 8, which is arranged at a side of the first driving member and configured that, in the closed position of the operation handle, the first driving member excites the first sensor. As illustrated by FIG. 12, the first sensor is communicatively connected to an electronic switch of the switching device, and upon the operation handle driving the first driving member to leave the closed position, the first driving member deactivates the first sensor, so that the first sensor sends an opening warning signal to the electronic switch.

Similarly, the bidirectional operation mechanism also includes a second sensor 9, which is arranged on the other side of the first driving member opposite to the side, and is configured that, in the open position of the operation handle, the first driving member excites the second sensor, the second sensor is communicatively connected to the electronic switch of the switching device, and upon the operation handle driving the first driving member to rotate from the open position to the closed position, the first driving member deactivates the second sensor, so that the second sensor sends a closing warning signal to the electronic switch.

For those skilled in the art, at least one of the first sensor and the second sensor may be provided. The sensor can be in the form of a microswitch, as illustrated by the accompanying drawings, but the sensor can also be a hall sensor, a grating sensor and other forms. The configuration of the first sensor and the second sensor is particularly beneficial upon the switching device is a solid-state circuit breaker.

FIG. 14 shows a transmission member 5' of another embodiment, the transmission member 5' includes a pivoting part 51' and a single leg 52'. One end of a torsion spring 53' is fixedly installed to the pivoting part 51' and the other end of the torsion spring 53' is fixedly installed to the second driving member 4. The torsion spring 53' is configured to keep the transmission member 5' in contact with the protrusion of the first driving member all the time, that is, the torsion spring 53' applies a force to drive the transmission member 5' to rotate toward the protrusion of to make the transmission member, after the protrusion of the first driving member rotates, the force of the torsion spring 53' drive the protrusion to rotate, so as to keep the contact between the transmission member and the protrusion. The transmission member 5' of this embodiment has the same function as the above-mentioned transmission member 5, and only the transmission member 5' during operation will be briefly described below.

In the closed position, the protrusion 31 of the first driving member abuts against the single leg 52', so as to keep the transmission member 5' in the abutting position and abutting against the trigger member in the locked position. Upon manually moving from the closed position to the open position, the protrusion 31 disengages from the abutment with the single leg 52', so that the transmission member 5' pivots to the disengaged position under the action of the torsion spring 53'. Upon manually moving from the open position to the closed position, the protrusion abuts against the single leg 52' to make the transmission member overcome the elastic force of the torsion spring 53', pivot to the abutting position, and abut against the trigger member in the locked position. Upon being electrically driven to move from the closed position to the open position, the single leg 52' abuts against the protrusion 31 and pushes the first driving member to rotate, after the operation handle spring passes through the dead point position, the protrusion continues to rotate, so that the transmission member pivots from the abutting position to the disengaged position under the action of the torsion spring 53'. Upon being electrically driven to move from the open position to the closed position, one end of the groove of the second driving member abuts against the protrusion and pushes the protrusion, after the operation handle spring passes through the dead point position, the protrusion pushes the single leg 52' to overcome the elastic force of the torsion spring 53' and drive the transmission member to pivot to the abutting position.

The present disclosure also provides a switching device assembly, which comprises the bidirectional operation mechanism and the switching device 10. The switching device can be any form of switch. The second driving member of the bidirectional operation mechanism is connected to the switching device by any suitable transmission mechanism, so that the switching device can perform opening operation and closing operation. For such transmission mechanism, those skilled in the art can design it according to their needs, and it is not the focus of the present disclosure, so it will not be described here.

Through the bidirectional operation mechanism, the second driving member can be driven by the first driving member to realize the opening operation and closing operation of the switching device, and the first driving member can also be driven by the second driving member to realize accurately indication of the opening position and the closed position by the operation handle, and during this process, the functions of pre-triggering alarm and free tripping can be realized.

Although the present disclosure has been described in the specification and illustrated in the drawings on the basis of referring to the various embodiments, those skilled in the art can understand that the above-mentioned embodiments are only preferred embodiments, and some technical features in the embodiments may not be necessary for solving specific technical problems, so these technical features may not be needed or omitted without affecting the solution of technical problems or the formation of technical solutions. Moreover, the features, elements and/or functions of one embodiment can be combined, integrated or coordinated with the features, elements and/or functions of one or more other embodiments as appropriate, unless the combination, integration or coordination is obviously impracticable.

The invention claimed is:

1. A bidirectional operation mechanism for a switching device, the bidirectional operation mechanism being coupled to the switching device, wherein the bidirectional operation mechanism comprises:

a housing;

an operation handle rotatably coupled to the housing and capable of rotating between a closed position and an open position, and indicating the closed position and the open position via a rotational position of the operation handle;

a first driving member rotatably coupled to the housing, the first driving member fixedly connected to the operation handle and capable of rotating together with the operation handle; and a second driving member rotatably coupled to the housing, the second driving member operatively connected to the first driving member and the switching device, wherein, upon an external force acting on the operation handle to rotatably drive the operation handle between the closed position and the open position, the operation handle drives the first driving member to rotate together with the operation handle, so that the first driving member abuts against and drives the second driving member to rotate, thereby enabling the switching device to perform a closing operation and an opening operation, wherein, upon the switching device performing the closing operation and the opening operation via a driving force of the switching device itself, the switching device is configured to drive the second driving member to rotate, so that the second driving member abuts against and drives the first driving member to rotate, thereby driving the operation handle to rotate in the closed position or the open position, wherein the driving force of the switching device itself is generated by an electric drive of the switching device.

2. The bidirectional operation mechanism according to claim 1, further comprising:

a transmission member pivotally arranged on the second driving member and capable of pivoting between an abutting position and a disengaged position; and a trigger member pivotally arranged on the second driving member and capable of pivoting between a locked position and an unlocked position via an electromagnet associated with the trigger member, wherein, in the locked position of the trigger member, the trigger member is located on a pivoting path of the transmission member along a first direction, wherein the trigger member is able to abut against the transmission member in the abutting position and prevent the transmission member from pivoting in the first direction, wherein upon the transmission member being in the disengaged position, the trigger member does not abut against the transmission member, wherein the first direction corresponds to a rotating direction of the operation handle from the closed position to the open position, wherein, in the unlocked position of the trigger member, the trigger member is not located on the pivoting path of the transmission member along the first direction and does not abut against the transmission member.

3. The bidirectional operation mechanism according to claim 2, wherein, in the closed position, the trigger member abuts against the transmission member, and upon an external force acting on the operation handle to rotatably drive the operation handle from the closed position to the open position, the transmission member pivots from the abutting position to the disengaged position, and a driving force of the first driving member is not transmitted to the second driving member;

wherein, in the open position, the trigger member does not abut against the transmission member, and upon an external force acting on the operation handle to rotatably drive the operation handle from the open position to the closed position, the transmission member pivots from the disengaged position to the abutting position, so that a driving force of the first driving member is transmittable to the second driving member;

wherein in the closed position, upon the switching device performing the opening operation via the driving force of the switching device itself, the transmission member stays in the abutting position and abuts against the trigger member, so that a driving force of the second driving member is transmittable to the first driving member; wherein, in the open position, upon the switching device performing the closing operation via the driving force of the switching device itself, the transmission member stays in the disengaged position without abutting against the trigger member, and a driving force of the second driving member is not transmitted to the first driving member.

4. The bidirectional operation mechanism according to claim 3, wherein the first driving member includes a protrusion extending toward the second driving member, wherein the second driving member includes a groove, wherein the protrusion of the first driving member extends into the groove, and wherein the protrusion is configured to abut against the transmission member.

5. The bidirectional operation mechanism according to claim 4, wherein, in the closed position, upon an external force acting on the operation handle to rotatably drive the operation handle to rotate from the closed position to the open position, the first driving member rotates in the first direction, causing the transmission member to pivot from the abutting position to the disengaged position without abutting against the trigger member, wherein, after the first driving member rotating by a predetermined angle, the protrusion of the first driving member abuts against one end of the groove and pushes the second driving member to rotate in the first direction, so that the switching device performs the opening operation.

6. The bidirectional operation mechanism according to claim 2, wherein the trigger member includes a first mating feature and the transmission member includes a second mating feature, wherein in the locked position of the trigger member, upon the transmission member pivoting in the first direction, the second mating feature of the transmission member is configured to abut against the first mating feature of the trigger member, thus being blocked by the trigger member.

7. The bidirectional operation mechanism according to claim 6, wherein the first mating feature and the second mating feature comprise hooks.

8. The bidirectional operation mechanism according to claim 5, wherein, upon an external force acting on the operation handle in the open position to rotatably drive the operation handle from the open position to the closed position, the first driving member rotates in a second direction, causing the protrusion of the first driving member to push the transmission member from the disengaged position to the abutting position, and after the first driving member rotating for a predetermined angle, the transmission member pivots to the abutting position to abut against the trigger member, and then the first driving member continues to rotate in the second direction to drive the second driving member to together rotate in the second direction through the transmission member and the trigger member, so that the switching device performs the closing operation.

9. The bidirectional operation mechanism according to claim 8, wherein, in the closed position, upon the switching device performing the opening operation via the driving force of the switching device itself, the second driving member rotates in the first direction, at this time, the trigger member is in the locked position and the transmission member is in the abutting position, so that the trigger member and the transmission member abut against each other and a driving force of the second driving member is transmitted to the first driving member, so that the first driving member also rotates in the first direction, thereby rotatably driving the operation handle to rotate from the closing position to the open position.

10. The bidirectional operation mechanism according to claim 9, further comprising an operation handle springe having a first end operatively connected to the operation handle and a second end fixed to the housing, and wherein the operation handle spring is configured such that, when the operation handle is rotatably driven by the second driving member from the closed position to the open position, upon the second driving member rotating in place, the operation handle spring passes through a dead point position and the first driving member continues to rotate in the first direction, so that the protrusion pushes the transmission member to pivot in the second direction from the abutting position to the disengaged position, and disengage from abutment with the trigger member.

11. The bidirectional operation mechanism according to claim 10, wherein, in the opening position, upon the switching device performing the closing operation via the driving force of the switching device itself, the second driving member rotates in the second direction, at this time, the trigger member is in the locked position and the transmission member is in the disengaged position, one end of the groove of the second driving member abuts against the protrusion of the first driving member, and a rotation of the second driving member pushes the first driving member to rotate in the second direction, so that the operation handle rotates from the open position to the closed position.

12. The bidirectional operation mechanism according to claim 11, wherein, upon the operation handle being rotatably driven by the second driving member from the open position to the closed position, upon the second driving member rotating in place, the operation handle spring passes through the dead point position and the first driving member continues to rotate in the second direction, so that the protrusion pushes the transmission member to pivot in the first direction from the disengaged position to the abutting position, and abuts against the trigger member in the locked position.

13. The bidirectional operation mechanism according to claim 12, wherein the transmission member includes a pivoting part, a first leg, and a second leg extending from the pivoting part, wherein the protrusion of the first driving member extends between the first leg and the second leg and abuts against the first leg and the second leg, wherein, in the closed position, upon an external force acting on the operation handle to rotatably drive the operation handle from the closed position to the open position, the protrusion pushes the first leg of the transmission member to drive the transmission member to pivot to the disengaged position in a second-direction opposite to the first direction, wherein, in the open position, upon an external force acting on the operation handle to rotatably drive the operation handle from the open position to the closed position, the protrusion pushes the second leg of the transmission member to drive the transmission member to pivot to the abutting position in the first direction, wherein, in the closed position, upon the switching device performing the opening operation via the driving force of the switching device itself, the second leg of the transmission member pushes the protrusion of the first driving member to drive the first driving member to rotate in the first direction, upon the second driving member rotating in place, the operation handle spring passes through the dead point position and the first driving member continues to rotate in the first direction, so that the protrusion pushes the first leg to pivot from the abutting position to the disengaged position, and disengage from abutment with the trigger member, wherein, in the open position, upon the switching device performing the closing operation via the driving force of the switching device itself, one end of the groove of the second driving member pushes the protrusion to drive the first driving member to rotate, and upon the second driving member rotating in place, the operation handle spring passes through the dead point position and the first driving member continues to rotate, so that the protrusion pushes the second leg to pivot from the disengaged position to the abutting position in the first direction, and abuts against the trigger member in the locked position.

14. The bidirectional operation mechanism according to claim 12, wherein the transmission member includes a pivoting part and a single leg extending from the pivoting part, wherein one end of a torsion spring is fixedly connected to the pivoting part of the transmission member and another end of the torsion spring is fixedly connected to the second driving member, and wherein the torsion spring is configured to keep the protrusion of the transmission member and the first driving member in contact at all times, wherein, in the closed position, the protrusion abuts against a part of the single leg to keep the transmission member in the abutting position, and upon an external force acting on the operation handle to rotatably drive the operation handle from the closed position to the open position, the protrusion disengages from abutment with the single leg, so that the transmission member pivots to the disengaged position via the torsion spring, wherein, in the open position, upon an external force acting on the operation handle to rotatably drive the operation handle from the open position to the closed position, the protrusion rotates to abut against the single leg and pushes the transmission member to pivot to the abutting position in the first direction, wherein, in the closed position, upon the switching device performing the opening operation via the driving force of the switching device itself, the single leg of the transmission member pushes the protrusion of the first driving member to rotatably drive the first driving member in the first direction, upon the second driving member rotating in place, the operation handle spring passes through the dead point position and the first driving member continues to rotate in the first direction, so that the single leg pivots in the second direction from the abutting position to the disengaged position under an action of the torsion spring, wherein, in the open position, upon the switching device performing the closing operation via the driving force of the switching device itself, one end of the groove of the second driving member pushes the protrusion to drive the first driving member to rotate, upon the second driving member rotating in place, the operation handle spring passes through the dead point position and the first driving member continues to rotate, so that an elastic force of the torsion spring pushes the single leg to pivot in the first direction from the disengaged position to the abutting position, and abuts against the trigger member in the locked position.

15. The bidirectional operation mechanism according to claim 3, wherein, upon the switching device performing a tripping operation, the electromagnet associated with the trigger member is configured to receive an electrical signal of the switching device for the tripping operation, so as to pivotally drive the trigger member from the locked position to the unlocked position, and then the second driving member rotates in the first direction, wherein, upon the operation handle being blocked and unable to rotate, the transmission member is pushed by the protrusion of the first driving member to rotate in the first direction, and the protrusion of the first driving member relatively moves in the groove of the second driving element.

16. The bidirectional operation mechanism according to claim 15, further comprising a return spring arranged between the first driving member and the second driving member, wherein, upon the switching device performing the tripping operation, the return spring stores energy along with a rotation of the second driving member in the first direction, and after the second driving member rotates in place, when the operation handle is released, the first driving member and the operation handle rotate together in the first direction via the return spring.

17. A bidirectional operation mechanism coupled to a switching device, the bidirectional operation mechanism comprising:

a housing;

an operation handle rotatably coupled to the housing and capable of rotating between a closed position and an open position, and indicating the closed position and the open position via a rotational position of the operation handle;

a first driving member rotatably coupled to the housing, the first driving member fixedly connected to the operation handle and capable of rotating together with the operation handle;

a second driving member rotatably coupled to the housing, the second driving member operatively connected to the first driving member and the switching device; and a first sensor communicatively connected to an electronic switch of the switching device, wherein the first sensor is arranged at a side of the first driving member, wherein, upon an external force acting on the operation handle to rotatably drive the operation handle between the closed position and the open position, the operation handle drives the first driving member to rotate together with the operation handle, so that the first driving member abuts against and drives the second driving member to rotate, thereby enabling the switching device to perform a closing operation and an opening operation, wherein, upon the switching device performing the closing operation and the opening operation via a driving force of the switching device itself, the switching device is configured to drive the second driving member to rotate, so that the second driving member abuts against and drives the first driving member to rotate, thereby driving the operation handle to rotate in the closed position or the open position, wherein the first sensor is configured such that, in the closed position of the operation handle, the first driving member excites the first sensor, and upon the operation handle driving the first driving member to leave the closed position, the first driving member deactivates the first sensor, so that the first sensor sends an opening warning signal to the electronic switch.

18. The bidirectional operation mechanism according to claim 17, further comprising a second sensor communicatively connected to the electronic switch of the switching device, wherein the second sensor is arranged at another side of the first driving member opposite to the side and is configured such that, in the open position of the operation handle, the first driving member excites the second sensor, and upon the operation handle rotatably driving the first driving member from the open position to the closed position, the first driving member deactivates the second sensor, so that the second sensor sends a closing warning signal to the electronic switch.

19. The bidirectional operation mechanism according to claim 18, wherein the first sensor and the second sensor are selected from microswitches, hall sensors and grating sensors.

20. A switching device assembly, wherein the switching device assembly comprises the bidirectional operation mechanism according to claim 1 and the switching device to which the bidirectional operation mechanism is coupled.

* * * * *